United States Patent

Badgley

[11] 4,114,989
[45] Sep. 19, 1978

[54] OVERHEAD ROOF-MOUNTED REAR VIEW MIRROR

[75] Inventor: Charles G. Badgley, St. Petersburg, Fla.

[73] Assignee: Richard B. Badgley, St. Petersburg, Fla.

[21] Appl. No.: 803,851

[22] Filed: Jun. 6, 1977

[51] Int. Cl.² .............................................. G02B 5/08
[52] U.S. Cl. .................................... 350/302; 350/307
[58] Field of Search ................ 350/299, 301, 302, 307

[56] References Cited

U.S. PATENT DOCUMENTS

| | | | |
|---|---|---|---|
| 3,033,083 | 5/1962 | Kerfoot | 350/302 |
| 3,229,580 | 1/1966 | Mitchell | 350/302 |
| 3,671,110 | 6/1972 | Van Wassenhoue | 350/307 |
| 4,033,678 | 7/1977 | Rudd | 350/302 |

FOREIGN PATENT DOCUMENTS

| | | | |
|---|---|---|---|
| 272,032 | 8/1964 | Australia | 350/301 |
| 946,191 | 4/1974 | Canada | 350/302 |

Primary Examiner—F. L. Evans
Attorney, Agent, or Firm—B. P. Fishburne, Jr.

[57] ABSTRACT

A rear view mirror unit for automobiles towing camping trailers or the like which block the view from the customary interior rear view mirror is provided. The unit is mounted removably on the roof of an automobile and the optical components are positioned favorably for viewing through the windshield by the driver of the automobile. The optical components are adjustable. The unit has a sturdy frame and housing portion enclosing the optical components and shielding them from the weather and has adjustable mounting feet which can conform to any automobile roof contour. The device requires no alteration of the automobile structure and does not damage or deface the automobile.

9 Claims, 7 Drawing Figures

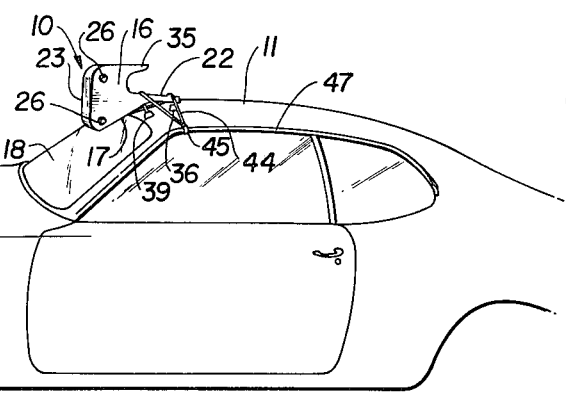
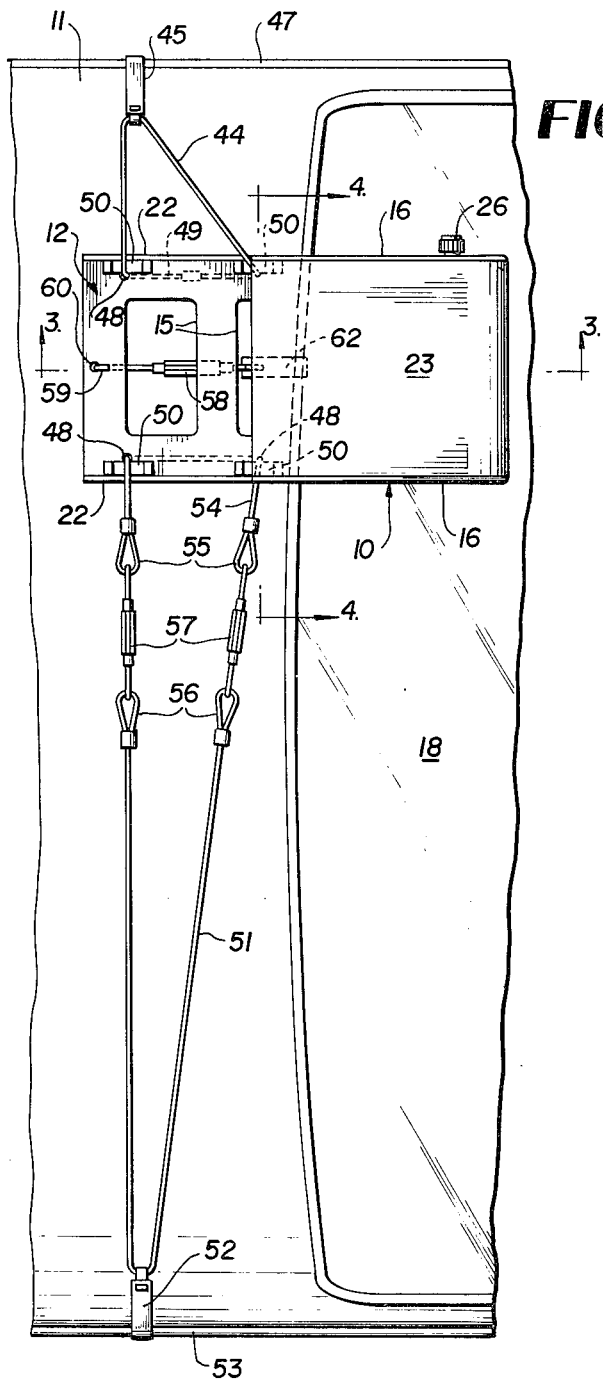
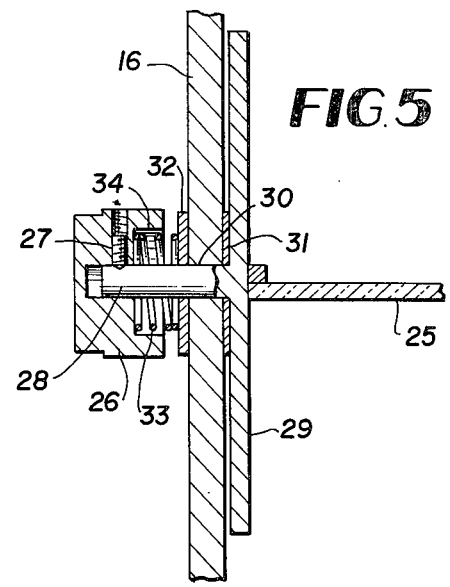
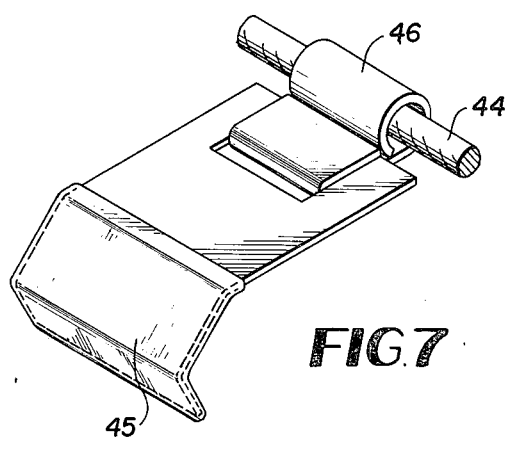

1

OVERHEAD ROOF-MOUNTED REAR VIEW MIRROR

BACKGROUND OF THE INVENTION

Overhead periscopic rear view mirror devices are known in the prior art and some representative examples of the patented prior art are contained in the following U.S. Pat. Nos. 1,491,153, 1,672,559, 2,161,006, 2,346,739, 3,625,599, 3,671,110, 3,704,062, 3,774,996 and 3,827,788.

Among the difficulties in the prior art devices tending to make them impractical is the necessity for altering the conventional vehicle structure, such as the roof line structure in order to accommodate the rear view mirror systems permanently. Such alterations are unacceptable to automobile manufacturers and to the public. Other prior art devices for a similar purpose have tended to be unduly costly and lacking in the necessary ruggedness and durability for practical usage.

With the above and other deficiencies of the prior art in mind, the objective of the present invention is to provide an entirely practical, efficient and comparatively economical overhead rear view mirror assembly or unit for automobiles which tow trailing vehicles whose heights block the view from the customary inside rear view mirror. The invention is in the form of a rugged and durable compact unit having a cast metal frame including a mounting frame section and a pair of side panels attached thereto and supporting adjustably a pair of mirrors which coact with a third stationary mirror on the mounting frame section. A preferably sheet metal shroud is connected to and spans the space between the frame side panels to form therewith an enclosure for the several mirrors protecting them from the weather. The supporting frame structure for the mirrors is shaped to position the mirrors in the most advantageous and convenient manner relative to the automobile driver and the windshield.

The mounting frame section which is horizontally disposed during use has adjustable mounting feet which can conform to any roof contour while providing a very stable and solid support base for the invention. A strong cable harness is attached to the mounting frame section with clip elements adapted to engage the opposite side rain gutters of the vehicle.

Other features and advantages of the invention will become apparent during the course of the following detailed description.

BRIEF DESCRIPTION OF THE DRAWINGS

FIG. 1 is a perspective view of the invention applied to the roof of an automobile.

FIG. 2 is a plan view of the invention on an enlarged scale.

FIG. 5 is an enlarged fragmentary section taken on line 5—5 of FIG. 3.

FIG. 7 is an enlarged fragmentary perspective view of an anchoring cable clip or hook.

DETAILED DESCRIPTION

Figure 3:
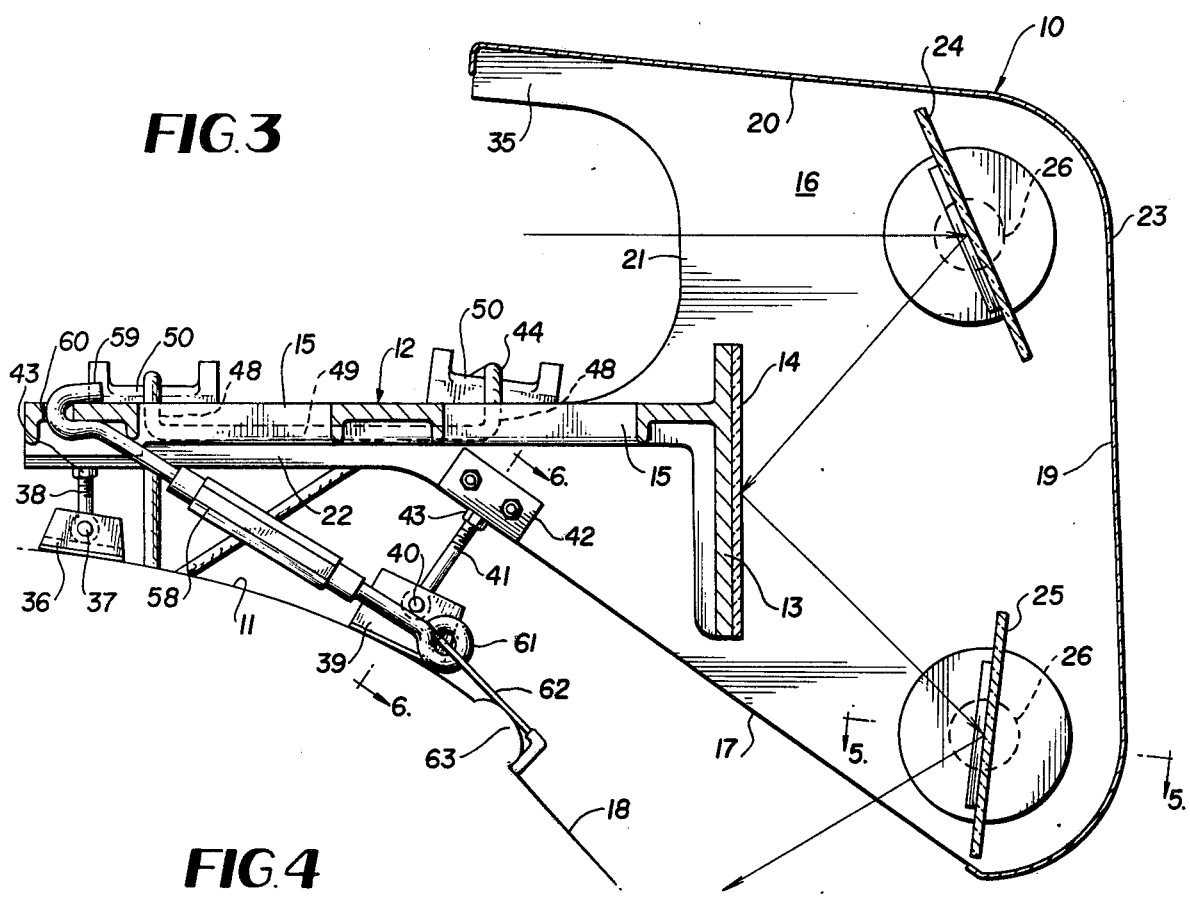
FIG. 3 is an enlarged central vertical longitudinal section taken on line 3—3 of FIG. 2.

Referring to the drawings in detail wherein like numerals designate like parts, an overhead rear view mirror unit according to the invention, in its entirety, is designated by the numeral 10, and in FIG. 1, the unit 10 is shown removably mounted on the roof 11 of an automobile. In this connection, the invention is easily installable on any automobile and requires no modification or damaging of the vehicle structure to accept the invention. The invention is entirely independent of the inside rear view mirror of the automobile, and is used in situations where the height of the trailing vehicle prevents usage of the inside mirror. The invention is capable of giving the automobile driver a clear view of the road rearwardly of the trailing camper or like vehicle, not shown in the drawings. It can be used alone or in conjunction with side mirrors on the automobile.

The rear view mirror unit 10 comprises a rigid horizontal mounting frame section 12 preferably formed of cast aluminum and having a forward vertical web 13 integral therewith projecting above and below the horizontal plane of the frame section 12 and serving to mount a vertical stationary mirror 14 secured thereto in any suitable manner. The mounting frame section 12 preferably has a pair of large rectangular openings 15 to reduce the weight of the same.

Figure 4:
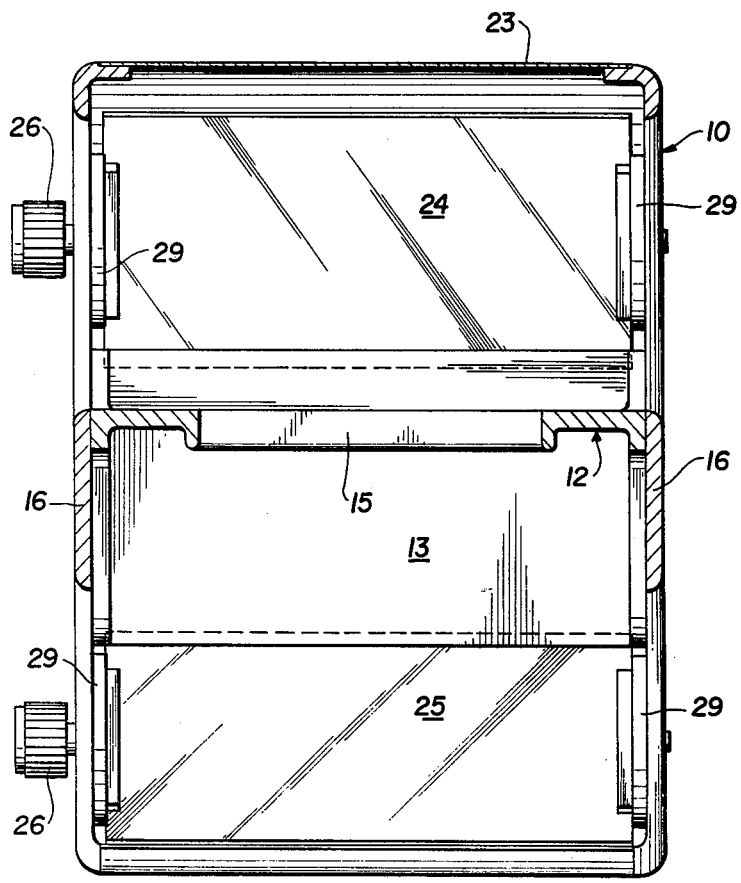
FIG. 4 is an enlarged transverse vertical section taken on line 4—4 of FIG. 2.

The unit 10 further comprises side vertical preferably cast metal frame sections or panels 16 which are attached with screws or the like, not shown, to the horizontal mounting frame section 12 to produce a rigid lightweight frame unit. As shown in the drawings, the side frame panels 16 have lower inclined edges 17 which lie above the automobile windshield 18 during use in roughly parallel relation thereto. The side panels 16 also have approximately vertical forward edges 19 and approximately horizontal top edges 20 which extend somewhat rearwardly of the windshield 18 and above the roof 11 of the automobile. The side panels 16 also have rear cut-outs 21 forming side rearwardly projecting horizontal arm extensions 22 on the two side panels of the frame unit. These arm extensions 22 are also secured by screws or the like to the opposite sides of the mounting frame section 12 which lies between the vertical side panels 16, FIG. 4. A shroud or cover 23 preferably formed of sheet metal spans the space between the side panels 16 and is attached by screws or other fastening means to the side panels, to form therewith a protective enclosure for the optical components of the unit.

Such components comprise, in addition to the stationary vertical mirror 14, an upper rotationally adjustable mirror 24 and a lower rotationally adjustable mirror 25, both disposed forwardly of the mirror 14 and above and below the same, respectively, as shown in FIG. 3. The upper mirror 24 lies within the upper forward corner of the enclosure means or hood formed by the elements 16 and 23 and the lower mirror 25 is in the lower forward corner of this enclosure immediately ahead of the windshield 18 so that the driver of the vehicle 11 may look directly into the mirror 25 conveniently. It should be understood that the unit 10 is mounted on the roof 11 in front of the driver for direct viewing, and not in front of the inside rear view mirror near the center of the vehicle which does not come into play at all in the use of the invention. The upper mirror 24 is disposed above the roof line of the automobile so that the image of objects behind the towed vehicle are reflected by the upper mirror 24 to the intermediate stationary vertical mirror 14 to the lower mirror 25 and then directly to the eyes of the driver who receives an erect image. The arrows in FIG. 3 depict the approximate optical path afforded by the invention.

As shown in FIG. 5, both the upper and lower mirrors 24 and 25 are mounted on the side panels 16 for rotational adjustment on transverse horizontal axes. To facilitate this adjustment, manual knobs 26 are secured as at 27 to rotatable shaft extensions 28 carried by discs 29 to which the respective mirrors 24 and 25 are attached securely. The discs 29 lie immediately inwardly of the side vertical frame panels 16 and the shaft extensions 28 are journaled within openings 30 formed in the side panels 16 and extend outwardly of the side panels, as shown. A friction washer 31 is disposed between each disc 29 and side panel 16 and another friction washer 32 is arranged on the outer face of the side panel 16 and is urged inwardly by a coil spring 33 surrounding the shaft extension 28 and housed within a recess 34 of the knob 26. The arrangement provides a smooth and vibration-free mounting for the two mirrors 24 and 25 which can easily have their angles changed by using the knobs 26 and will remain by friction in any selected adjusted position. The arrangement is simple and economical.

It can be noted here that the three mirror components 14, 24 and 25 are positioned in the invention in the most advantageous and convenient relationship to the driver and windshield 18, so that the driver does not have to turn his head or strain his neck in order to view the roadway rearwardly of the caravan. It should also be pointed out that the enclosure means formed by the elements 16 and 19 shields the mirror components from the weather and also forms an upper rear sun visor extension 35 on the unit to improve optical efficiency.

Figure 6:
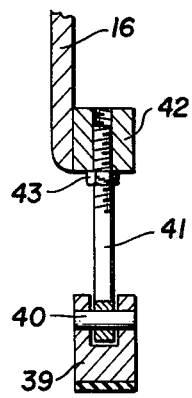
FIG. 6 is a similar section taken on line 6—6 of FIG. 3.

An important aspect of the invention lies in the manner of supporting the unit securely and stably on any automobile roof through the mounting frame section 12. For this purpose, a rear pair of preferably padded mounting feet 36 are swiveled as at 37 on eye bolts 38 which are dependingly secured to the rear end portion of frame section 12 on opposite sides thereof. The bottoms of the rear feet 36 engage the vehicle roof 11 and conform automatically to the curvature thereof. A co-acting forward pair of padded mounting feet 39 are similarly swiveled at 40 to the bottoms of eye bolts 41 engaging within bosses or blocks 42 carried by the inner sides of the vertical panels 16, see FIG. 6. The eye bolts 41 are set at an angle normal to the edges 17, whereas the rear eye bolts 38 are vertical. The arrangement is such that the four mounting feet 36 and 39, when properly engaged with the roof 11, will support the frame section 12 horizontally and at a proper distance above the roof while the optical mirrors of the unit are arranged forwardly of and above the windshield, in front of the driver, as previously described. The eye bolts 38 and 41 may be adjusted by means of their threads and then locked by lock nuts 43. The mounting system is very strong, safe and reliable and yet simple and economical.

In conjunction with the adjustable mounting feet 36 and 39, the rear view mirror unit 10 is secured by cable harness means, as shown in FIGS. 1 and 2. This means comprises on the driver's side of the unit 10 a comparatively short cable harness loop 44 having a clip or hook element 45 attached adjustably thereto by a sleeve fitting 46. The clip 45 is engaged detachably with the adjacent rain gutter 47 of the automobile. The loop 44, FIG. 2, passes through a pair of openings 48 in the horizontal frame section 12 and has a portion 49 of the loop arranged below the frame section 12. The top of the frame section 12 on opposite sides thereof is provided with arched cable-engaging rests 50 preferably cast integrally with the frame section 12. These rests 50 assure that the cable loops do not come in contact with any sharp edges.

On the other side of the unit 10, a long cable loop is provided including a section of cable 51 having a clip 52 like the clip 45 and engaging the other rain gutter 53 of the automobile. A shorter cable section 54 engages through apertures 48 of the frame section 12 and has loop terminals 55 connected with similar loop terminals 56 of cable section 51 through adjustable turnbuckles 57 by means of which the entire cable harness for the unit 10 may be tightened across the roof 11 of the vehicle to secure and stabilize it. To prevent any rearward displacement of the unit 10, a center longitudinal turnbuckle 58 is disposed beneath the horizontal frame section 12 with a rear hook terminal 59 thereof engaging an aperture 60 of the frame member and a forward eye 61 of the turnbuckle carries a clip 62 which engages the upper molding 63 of windshield 18. Thus, the overhead rear view mirror unit 10 is safely and securely anchored against movement in all directions on the vehicle roof 11.

The advantages of the invention over the prior art have now been brought forth and should be readily understood by those familiar with the art. The invention is characterized by simplicity, strength and comparative economy of manufacture. It is easily installed on any automobile and easily removable therefrom. It is lightweight, optically efficient and very convenient in terms of its relationship to the eyes of the driver. The device is entirely practical and should be acceptable both to the driving public and vehicle manufacturers.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An overhead rear view mirror for mounting on the roof of an automotive vehicle in a fixed relationship to the windshield of such vehicle and in alignment with the eyes of the vehicle driver, said overhead rear view mirror comprising a substantially horizontal frame section having plural adjustable mounting feet depending therefrom and being engageable with an automobile roof, said horizontal frame section including a substantially vertical web at its forward end near and above the windshield of a vehicle on which the device is mounted, a stationary substantially vertical mirror section on said vertical web, a pair of substantially vertical side panels fixedly attached to opposite sides of the horizontal frame section and extending above, below and forwardly of said vertical web and stationary mirror section, a shroud spanning the space between said vertical side panels and connected thereto and forming with the side panels a mirror enclosure, an upper and a lower mirror section in said enclosure forwardly of the stationary mirror section and above and below the latter, respectively, means mounting said upper and lower mirror sections rotatably on horizontal transverse axes in said enclosure including rotary shaft means connected with at least one of said vertical side panels whereby the reflective angles of said upper and lower mirror sections may be adjusted, and adjustable cable harness means connected with said horizontal frame section and adapted to releasably engage a structural part of a vehicle on which the device is mounted for securing the device to the vehicle.

2. An overhead rear view mirror as defined in claim 1, and said mirror enclosure being downwardly and forwardly tapering with its lower edge generally parallel to the windshield of a vehicle on which the device is mounted and with said lower mirror section optically aligned with the windshield at a convenient level for viewing by the vehicle driver.

3. An overhead rear view mirror as defined in claim 1, and manual knobs on said rotary shaft means and disposed exteriorly of one vertical side panel, whereby said upper and lower mirror sections can be manually rotated for correct adjustment.

4. An overhead rear view mirror as defined in claim 3, and friction clutch means connected with said rotary shaft means and said knobs enabling said upper and lower mirror sections to remain fixed in selected adjusted positions.

5. An overhead rear view mirror as defined in claim 1, and said adjustable cable harness means comprising cable harness loops connected with opposite sides of said horizontal frame section and each having a clip element engageable with a vehicle rain gutter, at least one of said cable loops having adjusting turnbuckle means therein.

6. An overhead rear view mirror as defined in claim 5, and an additional turnbuckle unit arranged longitudinally of said horizontal frame section and beneath it and having one end coupled with said frame section and another end releasably engaged with a stationary element of a vehicle on which the device is mounted, whereby the device is secured against movement in all directions after installation.

7. An overhead rear view mirror as defined in claim 1, and said mirror enclosure including a top approximately horizontal rearwardly extending sun visor portion above said horizontal frame section, the bottom of said mirror enclosure facing a windshield being open.

8. An overhead rear view mirror as defined in claim 5, and arched cable rests on the upper side of said horizontal frame section near the opposite sides thereof, said horizontal frame section having cable loop receiving apertures near said rests receiving said cable loops and positioning them relative to said rests.

9. An overhead rear view mirror as defined in claim 1, and said horizontal frame section and said vertical side panels being metal castings, and said shroud formed by a section of sheet metal.

* * * * *